(12) United States Patent
Sakurai et al.

(10) Patent No.: US 7,971,561 B2
(45) Date of Patent: Jul. 5, 2011

(54) DIESEL ENGINE EXHAUST PURIFIER

(75) Inventors: Shinichiro Sakurai, Tokyo (JP); Satoru Shinoda, Yokohama (JP)

(73) Assignee: Lenz Environment Resources Co., Ltd., Tokyo (JP)

( * ) Notice: Subject to any disclaimer, the term of this patent is extended or adjusted under 35 U.S.C. 154(b) by 1475 days.

(21) Appl. No.: 10/468,507

(22) PCT Filed: Dec. 19, 2001

(86) PCT No.: PCT/JP01/11123
§ 371 (c)(1),
(2), (4) Date: Nov. 14, 2006

(87) PCT Pub. No.: WO03/052252
PCT Pub. Date: Jun. 26, 2003

(65) Prior Publication Data
US 2010/0263623 A1 Oct. 21, 2010

(51) Int. Cl.
*F02B 47/02* (2006.01)
(52) U.S. Cl. ...................... 123/25 E; 123/25 J

(58) Field of Classification Search ................ 123/25 R, 123/25 D, 25 E, 25 F, 25 J–25 N
See application file for complete search history.

(56) References Cited

FOREIGN PATENT DOCUMENTS
JP  7-166962  6/1995
JP  7-166963  6/1995

*Primary Examiner* — Noah Kamen
(74) *Attorney, Agent, or Firm* — Blank Rome LLP

(57) ABSTRACT

An exhaust emission control apparatus for diesel engines is offered which is capable of achieving better power performance and exhaust emission purification efficiency in an optimally reconciled manner, and from which torque deficiency during hill climbing on a steep slope is eliminated. Emulsified fuel including light oil, water and emulsifier supplied respectively from a light oil tank 4, a water tank 5 and an emulsifier cartridge 6, of which the water ratio is adjusted by flow variable control valves 11-13, is supplied to a combustion chamber 4. The water ratio is normally set to a basic water ratio corresponding to the signal of an accelerator opening sensor 39 (Step S32). However, when a difference between target acceleration and actual acceleration of a vehicle corresponding to the accelerator pedal opening exceeds a predetermined value (Step S36), the basic water ratio is corrected so as to reduce the water ratio (Step S37).

14 Claims, 5 Drawing Sheets

DIESEL ENGINE EXHAUST PURIFIER

BACKGROUND OF THE INVENTION

The present invention relates to an exhaust purifier for diesel engines adapted to suppress particularly the generation of nitrogen oxides in the exhaust gas.

As for a conventional exhaust purifier for diesel engines, a technique in which water and emulsifier are added to fuel and supplied to a combustion chamber as emulsified fuel to lower the highest combustion temperature in the combustion chamber whereby generation of nitrogen oxides are suppressed is known from the description in Japanese Laid-Open Patent Application (Kokai) (A) No. Heisei 7-166962 (1995) titled "ENGINE EMULSIFIED FUEL FEEDER UNIT" and Japanese Laid-Open Patent Application (Kokai) (A) No. Heisei 7-166963 (1995) titled "ENGINE EMULSIFIED FUEL FEEDER UNIT."

In the above official gazettes, it is surely described that the ratio of adding water (water ratio) to the fuel is decided depending on the state of load on the engine. However, they do not give any particular description about the above-mentioned water ratio, which is the most indispensable to make the technique practicable in the case of vehicles equipped with an engine that is operated in a broad load range corresponding to the running conditions, unlike the case of ships where the technique has already been put into practical use.

According to research and the experiment of the inventors, it was found that engine power performance and exhaust emission purification efficiency cannot be optimally reconciled in a broad engine operational range by fixing the water ratio to the load at a specific level or by simply increasing the water ratio in a proportional manner corresponding to the increase of the load.

The object of the present invention is to solve the above described problem and to provide an exhaust purifier for diesel engines capable of achieving better power performance and exhaust emission purification efficiency in a compatible and enhanced manner even in a broad engine operational range.

SUMMARY OF THE INVENTION

The present invention of an exhaust purifier for a diesel engine comprises a fuel injection valve for injecting fuel into a combustion chamber of a diesel engine; a fuel supply system for supplying fuel; a water supply feed unit for supplying water; an emulsifier feed unit for supplying emulsifier; a load detection means for detecting an accelerator pedal depression amount; a water ratio adjusting device for adjusting a water ratio from the water supply feed unit in relation to fuel from the fuel supply system; a static mixer for blending emulsified fuel from the emulsifier, the adjusted fuel and water and for supplying this emulsified fuel to the fuel injection valve; a torque deficiency judgment means for judging whether or not a torque deficiency relative to the accelerator pedal depression amount; and a water ratio determination means for setting a basic water ratio in which the water ratio of a larger accelerator depression amount in an engine operating range increases more than a smaller accelerator pedal depression amount in an engine operating range corresponding to accelerator pedal depression amount detected by the load detection means and for controlling the water ratio adjusting device to regulate a basic ratio when the torque deficiency judgment means judges a torque deficiency does not exist and a lower water ratio when the torque deficiency judgment means judges a torque deficiency does exist.

In the above constitution, fuel, water and an emulsifier are supplied respectively from a fuel supply system, a water supply feed unit and an emulsifier feed unit. Then, after optimum water ratio is decided corresponding to the accelerator pedal depression amount by the water ratio determination means, amount of the fuel and amount of the water are adjusted in the water ratio by the water ratio adjusting device to produce an emulsified fuel with the emulsifier. The emulsified fuel is preferably a water-in-oil type (W/O type).

In the control of the water ratio, the basic water ratio is set up such that, during normal driving, the water ratio in the engine operational range having a large acceleration pedal depression amount is increased compared with that having a small accelerator pedal depression amount. Accordingly, since the combustion temperature is lowered due to the existence of the water, it is possible to reduce the generation of NOx. In this case, since the water ratio is controlled as described above, it is always possible to allow the exhaust emission control efficiency and engine power performance to be consistent with each other even in a broad engine operational range like the case of vehicles.

Further, since it is determined by the torque deficiency judgment means whether it is the state of torque deficiency based on accelerator pedal depression amount, even when hill climbing on a steep slope or sudden acceleration with a heavy load, the water ratio is reduced smaller than the basic water ratio thereby a larger torque can be obtained. Accordingly, it is possible to ensure the power performance that enables the above-mentioned hill climbing and sudden acceleration. In this case, the generation of the NOx increases. However, since the above period of the operation is short and the engine speed decreases because of the large load, the amount of the generated NOx becomes less than that generated during normal driving. Although soot and the like increases, these can be removed by using an oxidation catalyst, heater or the like provided in the exhaust system.

As described above, during normal driving even with a large load, it is possible to make engine power performance and exhaust emission purification efficiency optimally compatible.

According to the present invention of the exhaust purifier for a diesel engine, the torque deficiency judgment means judges a torque deficiency exists when the accelerator pedal depression amount is an amount of the actual maximum depression of an accelerator pedal.

Since the judgment of the torque deficiency is made corresponding to the magnitude of the accelerator pedal depression amount, if the driver feels that torque is deficient and depresses the accelerator pedal to the maximum amount level, torque deficiency can be judged easily and the intention of the driver certainly detected. The maximum pedal depression of the accelerator pedal may be determined based on the magnitude of output voltage using a potentiometer which detects the pedal depression amount of the accelerator pedal, or may be constituted with a kick down switch so as to turn on at the maximum pedal depression of the accelerator pedal. Accordingly, the maximum pedal depression of the accelerator can be detected using a simple and inexpensive device.

According to the present invention, of the exhaust purifier for a diesel engine, the torque deficiency judgment means judges a torque deficiency exists when an acceleration difference is acquired and this acceleration difference becomes higher than a predetermined value by subtracting the target acceleration of a vehicle or a wheel made to respond to the accelerator pedal depression amount from the actual acceleration of the vehicle or wheel.

After deciding the target acceleration of the vehicle or wheel corresponding to the detected accelerator pedal depression amount, the actual acceleration is subtracted from the target acceleration. The acceleration difference is compared with the predetermined value by the torque deficiency judgment means, and when the acceleration difference is more than a predetermined value, it is judged as torque deficiency. If judged as torque deficiency, the water ratio determination means controls the water ratio adjustment device so that the water ratio becomes smaller than the basic water ratio.

Accordingly, when hill climbing on a steep slope or a sudden acceleration with a heavy load, the water ratio is decreased so as to be a value smaller than the water ratio during normal driving such as on a flat road with a light load. As a result, the output torque of the engine is increased and the required power performance is ensured.

According to the present invention of the exhaust purifier for a diesel engine, wherein a reduction of the water ratio while judging the torque deficiency is set so that as the acceleration difference becomes higher the water ratio becomes lower.

As described above, by adapting the reduction of the water ratio so that a larger acceleration difference results in a smaller water ratio, it becomes possible to reconcile power efficiency and exhaust gas purification with more sufficient accuracy according to the actual running conditions.

According to the present invention of the exhaust purifier for a diesel engine, wherein the water ratio determination means cancels reduction of the water ratio when the acceleration difference becomes lower than a preset value less than the predetermined value.

At the torque deficiency, as a result of the correction of the basic water ratio so that the water ratio is reduced to increase the output torque of the engine, the acceleration becomes larger and the difference between the target and actual acceleration becomes less than a set value that has been set to a value smaller than the predetermined value. Then, the control of water ratio reduction will be stopped and returns to the basic water ratio. Thereby, the rise of engine power is suppressed to the required torque and becomes possible to control exhaust gas purification.

According to the present invention of the exhaust purifier for a diesel engine, wherein the predetermined value has a plurality of different values corresponding to the magnitude of the accelerator pedal depression amount.

By setting the predetermined value to two or more different values in accordance with the accelerator pedal depression amount, it becomes possible to control the water ratio more finely corresponding to the running situations and the engine operational conditions. Accordingly, power performance and exhaust emission purification efficiency can be optimally reconciled.

According to the present invention, of the exhaust purifier for a diesel engine, wherein the predetermined value increases as the accelerator pedal depression amount becomes higher.

In this case, by adapting so that the predetermined value increases as the accelerator pedal depression amount becomes larger, it becomes possible to obtain the acceleration closer to the acceleration requested by the driver.

According to the present invention for the exhaust purifier for a diesel engine, wherein the preset value is set to become lower as the accelerator pedal depression amount becomes higher.

By adapting the set value so as to decrease as the accelerator pedal depression amount becomes larger, it becomes possible to obtain the acceleration closer to the acceleration requested by the driver like above. This setting is suitable for vehicles which do not have much margin in maximum engine power.

According to the present invention of the exhaust purifier for a diesel engine, wherein the torque deficiency judgment means judges torque deficiency when the acceleration difference becomes higher than a predetermined value, even though the accelerator pedal depression amount increases more than a predetermined amount within a predetermined time.

The torque deficiency judgment means judges that it is the state of torque deficiency when the acceleration difference becomes more than a predetermined value even when the driver depresses the accelerator pedal sharply demanding acceleration. Accordingly, it is possible to reliably detect the will of the driver to accelerate positively by the sudden depression of the accelerator pedal by the driver. The deficiency of torque (accordingly, acceleration) in this case can be detected easily.

According to the present invention of the exhaust purifier for a diesel engine, wherein the torque deficiency judgment means judges torque deficiency when vehicle speed decelerates more than predetermined within a predetermined time even though the accelerator pedal depression amount is more than a predetermined amount and the accelerator pedal depression amount does not change substantially within a predetermined time.

In this case, before a driver notices, it is easily detectable the vehicle's sudden slowdown and becomes torque deficient.

According to the present invention of the exhaust purifier for a diesel engine, wherein the accelerator pedal depression amount is a value corresponding to the fuel flow rate supplied to the fuel injection valve, or a value corresponding to the flow rate difference of this flow rate and the return fuel flow rate discharged from the fuel injection valve.

As described above, if the accelerator pedal depression amount, as a result of a water ratio are determined with a flow rate or flow rate difference, it will become unnecessary to receive an information signal from the engine control unit side. Thus, the exhaust purifier of the present invention can be applied to a variety of types of vehicles, which have already been put on the market from various makers. Notably, it is possible to apply the same concept to many different vehicles without taking into consideration the signal processing of the engine control unit and the transfer method of the signal, which are different with each maker and each vehicle.

According to the present invention of the exhaust purifier for a diesel engine, wherein the water ratio determination means sets the water ratio to substantially zero for a period of a predetermined time from diesel engine start-up time until any one of the engine coolant, the temperature of the return fuel in the return passage or the transmission temperature reaches a predetermined temperature.

According to the present invention of the exhaust purifier for a diesel engine, wherein the water ratio determination means sets the water ratio to substantially zero until a predetermined time elapses after detecting a diesel engine stop signal.

According to the present invention of the exhaust purifier for a diesel engine, wherein the water ratio is controlled corresponding to the exhaust gas temperature within a diesel particulate filter.

In the case when there is a possibility that the catalyst or filter may be damaged due to extraordinary high temperatures of the exhaust gas in a diesel particulate filter, it is possible to reduce the temperature of the exhaust gas by increasing the water ratio to prevent the above filter from overheating. Conversely, to accelerate the combustion of the soot or the like while the temperature in the filter is low, it is possible to raise the temperature in the filter easily and swiftly by reducing the water ratio to raise the temperature of the exhaust gas.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIGS. 4 and 5 are control flow charts for controlling water ratio adjustment in the exhaust purifier of the diesel engine shown in FIG. 3, wherein FIG. 4 shows the first half thereof and FIG. 5 shows the second half thereof.

DETAILED DESCRIPTION OF THE INVENTION

Figure 1:
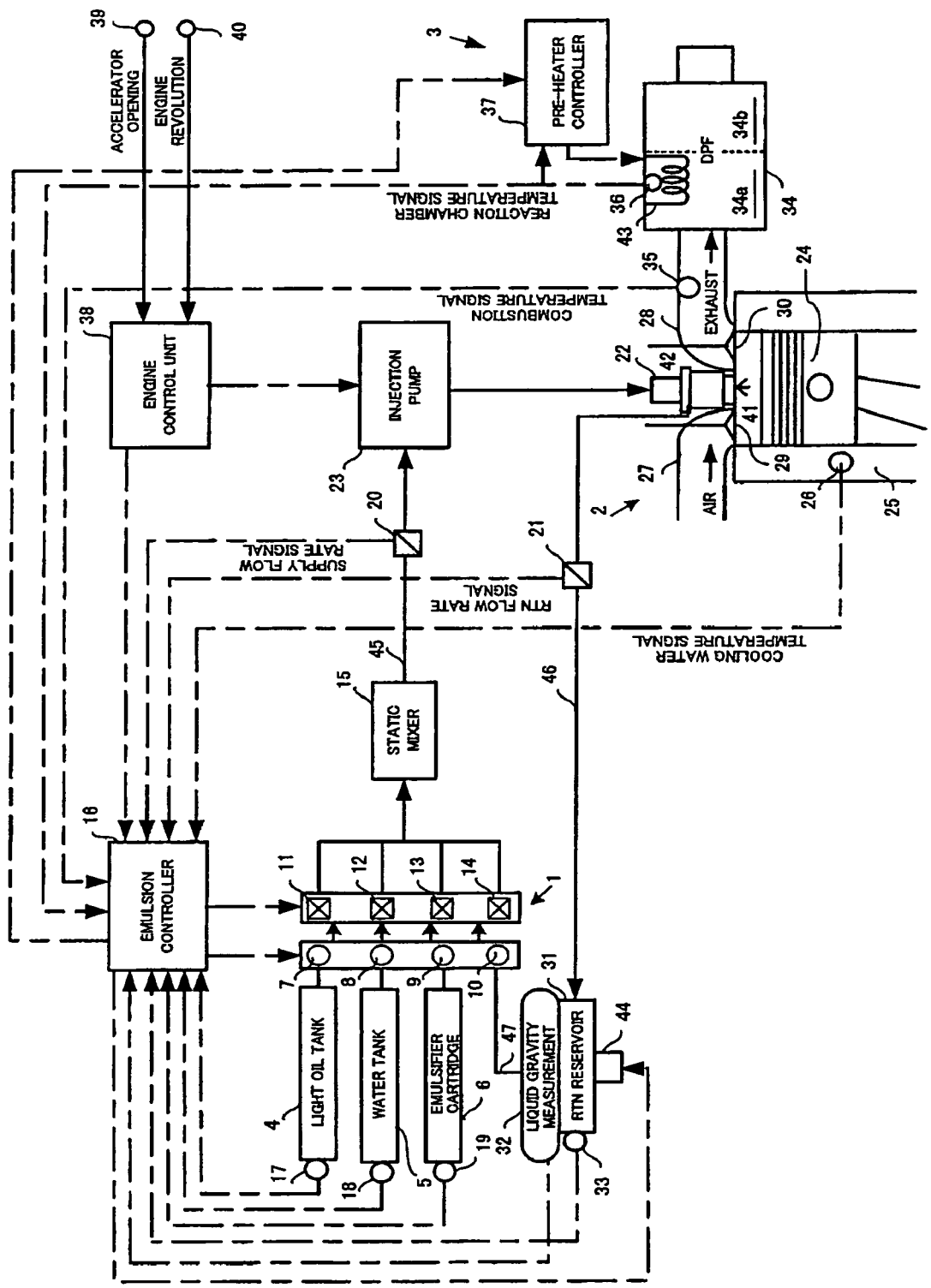
FIG. 1 is a diagram showing the entire power train containing the exhaust purifier for diesel engines relating to the first embodiment of this invention.

The present invention will hereinafter be described in detail with reference to the accompanying drawings. As shown in FIG. 1, a power train equipped with an exhaust purifier for diesel engines according to this embodiment includes a fuel supply system 1 that generates an emulsified fuel by mixing fuel, water and emulsifier; a diesel engine 2 that burns the emulsified fuel supplied from the fuel supply system 1 to obtain driving output; and a rear exhaust emission control apparatus 3 that cleans, particularly, soot from exhaust gas emitted from the diesel engine 2.

Hereafter, a detailed description will be given as to the above components.

The fuel supply system 1 includes a light oil tank 4 for storing light oil as the fuel, a water tank 5 (synonymous with water supply feed unit) for storing water to be added to the fuel, an emulsifier cartridge 6 (synonymous with emulsifier feed unit) for storing an emulsifier for emulsifying the fuel and water.

The light oil tank 4, the water tank 5 and the emulsifier cartridge 6 are connected with a fuel pump 7, a water pump 8 and an emulsifier pump 9 that are driven by an electric motor respectively, and each of them can suction the light oil, water and emulsifier respectively. An emulsion controller 16 controls the operation of these pumps 7-9 separately.

The discharge opening of each pump is connected to the inlet of each of flow variable control valves (ratio adjustment units) 11-13. As described later, these flow variable control valves 11-13 control independently the size of the respective dimensions of the flow path by means of emulsion controller 16 according to the running conditions.

The fuel, water and emulsifier of which the flow rate has been adjusted respectively by these flow variable control valves 11-13 flows into a static mixer 15, segmented and mixed into the emulsified fuel therein. The supply flow rate of the emulsified fuel to a fuel injection pump 23 in the above process is monitored by a supply flow rate sensor 20 and is fed back to the emulsion controller 16 to generate optimum emulsified fuel.

The static mixer 15 generates water-in-oil type (W/O type) emulsified fuel. Accordingly, Hydrophile and Lipophile Balance (hereinafter referred to as HLB) makes the above-mentioned emulsifier about HLB range six, and the amount of supply is made into about a 1.2% mass of fuel and water (volume about 1.5%). Fundamentally, the water ratio is decided on the basis of the engine load, i.e., the amount of accelerator pedal depression.

That is to say, the water ratio is controlled so that the basic ratio is resulted in such that the larger load on the engine the higher water ratio as follow, that is, in the case of normal driving when running on a flat road with a light load, the light oil:water is preferably set to, for example, 95:5 within a range where the accelerator pedal depression amount is lower; and the light oil:water is preferably set to, for example, 80:20 within a range where the accelerator pedal depression amount is higher. Depending on the engine or combustion conditions, it is possible that the water may be practically set not to 80:20 but, for example, to 70:30. However, in the case of vehicles, it is not practical that the water ratio is increased to a level as 50:50 like the case of ships or a boiler.

In the above-described constitution, the light oil tank 4 and the fuel pump 7 constitute the fuel supply system; the water tank 5 and the water pump 8 constitute a water supply feed unit; and the emulsifier cartridge 6 and the emulsifier pump 9 constitute emulsifier supply equipment. However, the water pump 8 and/or the emulsifier pump 9 are not indispensable components. It is possible to adapt so that the water and/or emulsifier are suctioned into the fuel that flows into the static mixer 15.

On the other hand, the flow variable control valves 11 and 12 for fuel and water constitute a water ratio adjusting device.

The outlet of the static mixer 15 is connected to the inlet of the fuel injection pump 23 via a fuel supply path 45. In the fuel supply path 45, the supply flow rate sensor 20 is provided. The sensor always detects the flow rate of the emulsified fuel supplied to the fuel injection pump 23 from the static mixer 15. The flow rate signal is sent to the emulsion controller 16.

The fuel injection pump 23, whose outlet is connected to the supply port of the fuel injection valve 22, is controlled by an engine control unit 38 to decide the injection amount and the injection timing of the emulsified fuel from the fuel injection valve 22 to a combustion chamber 41.

The discharge port of the fuel injection valve 22 is connected to a return reservoir 31 via a return path 46. In the return path 46, a return flow rate sensor 21 for detecting the flow rate of the returned fuel is provided, which sends flow rate signal about the returned fuel to the emulsion controller 16.

The return reservoir 31 stores the emulsified fuel drained from the discharge port of the fuel injection valve 22 so that the returned fuel can be supplied again to the fuel injection valve 22 via the static mixer 15 and the like.

That is, connected to the return reservoir 31 is a suction port of a return pump 10 driven by an electric motor so that the return pump 10 can suction the returned fuel within the return reservoir 31. The discharge opening of the return pump 10 is connected to the inlet of the static mixer 15 via a flow variable control valve 14.

In this case, the returned fuel in the return reservoir 31 is returned to the inlet of the static mixer 15 again. Here, it is adapted so that at least any one of the light oil from the light oil tank 4, the water from the water tank 5 and the emulsifier from the emulsifier cartridge 6 can be supplied to the static mixer 15 along with the returned fuel; thereby, the water ratio (ratio of water to the light oil) at the outlet of the static mixer 15 is controlled to a desired value. Basically, it is adapted so that the reuse of the returned fuel has the priority to the supply of the new fuel, water and emulsifier. As a result, when the water ratio does not substantially change in such a case of continuous high speed driving, there may be a case where only the returned fuel is to be supplied to the static mixer 15.

For the purpose of the reuse as described above, provided to the return reservoir 31 is a water ratio detection sensor 32 for measuring the water ratio of the return fuel stored therein, and detection signal is input to the emulsion controller 16. Here, the water ratio detection sensor 32 measures the water ratio by using a liquid gravity measurement or an optical measurement of liquid visual density or the like.

In this case, the emulsion controller 16 determines the amount light oil, water and emulsifier supplied respectively from the amount of returned fuel and the amount of the light oil tank 4, the water tank 5 and the emulsifier cartridge 6 while taking into consideration the information about the water ratio of the returned fuel and the re-supplied amount of the returned fuel, and controls the pumps 7-10 and the flow variable control valves 11-14 to be capable of generating an emulsified fuel with an optimum water ratio.

At the same time, an agitator 44 capable of agitating the returned fuel therein is attached to the return reservoir 31. The agitator 44 is driven under predetermined conditions (for example, at every predetermined point of time, or at a point of engine start or the like), and the emulsion controller 16 controls to prevent the emulsified fuel from separating into fuel and water.

Here, at the engine start or the like, the return pump 10 is not activated and the flow variable control valve 14 is left closed until the returned fuel in the return reservoir 31 is sufficiently agitated and the emulsified fuel is stabilized so that the new emulsified fuel is generated being supplied from the light oil tank 4, the water tank 5 and the emulsifier cartridge 6.

The light oil tank 4, the water tank 5, the emulsifier cartridge 6 and the return reservoir 31 are provided with a residual sensors 17, 18, 19 and 33 respectively to send the associated residual signals to the emulsion controller 16; thereby the emulsion controller 16 emits residual alarm by means of alarm lamp, or changes the target water ratio of the emulsified fuel to be supplied to the fuel injection valve 22 after the residual amount has reduced to a predetermined amount or less.

The fuel injection valve 22 is attached to a cylinder head 42, and the injection port thereof is located in the combustion chamber 41 formed by a cylinder 25 and a piston 24 of the diesel engine 2 to be capable of injecting the emulsified fuel into the combustion chamber. Formed in the cylinder head 42 are an intake port 27 for guiding intake air and an exhaust port 28 for discharging exhaust gas; and an intake valve 29 and an exhaust valve 30 opens and closes the portions between the combustion chamber 41 and the intake port 27 and the exhaust port 28, respectively. Provided to the cooling water path formed in the cylinder 25 is a cooling water temperature sensor 26 for detecting the water temperature to send the cooling water temperature signal detected therein to the engine control unit 38.

The engine control unit 38 is input with accelerator opening signal, engine revolution signal and the like from an accelerator opening sensor (load detection means) 39, an engine revolution sensor 40 or the like to decide the injection amount, injection timing or the like necessary for operating the diesel engine 2.

From the engine control unit 38 to the emulsion controller 16, accelerator opening signal, required fuel information signals (signals about injection amount, injection timing and the like) are input.

The rear exhaust emission control apparatus 3 is constituted mainly of a Diesel Particulate Filter (DPF) 34, the DPF 34 being connected to the exhaust port 28 of the diesel engine 2 via an exhaust pipe. Provided to the exhaust port 28 is a combustion temperature sensor 35 for detecting the temperature of the exhaust gas discharged from the diesel engine 2 to send the temperature signal to the emulsion controller 16.

The above-mentioned DPF 34 includes an oxidation catalyst reaction chamber 34a (oxidation chamber) at the upstream side and an ash accumulation chamber 34b at the downstream side. The oxidation catalyst reaction chamber 34a is provided with an oxidation catalyst for oxidizing particulate matter (mainly, soot such as carbon or the like) in the exhaust gas using nickel or the like, and the inside of which can be heated with an electric heater 43 disposed therein. A pre-heater controller 37 controls the electric heater 43.

Further, the oxidation catalyst reaction chamber 34a has a reaction chamber temperature sensor 36 for detecting the temperature inside the chamber and sends the reaction chamber temperature signal detected by the reaction chamber temperature sensor 36 to the pre-heater controller 37 and the emulsion controller 16.

Next, the working of the exhaust purifier for diesel engines according to the first embodiment, which has the above-described constitution, will be described.

First of all, to start the engine, the starter switch is turned ON to rotate the starter (not shown) to give turning force to the diesel engine 2.

Accompanying the engine start, the emulsion controller 16 judges the engine is the starting by detecting the ON-actuation of the starter switch. The emulsion controller 16 receives oxidation catalyst reaction temperature signal from the reaction chamber temperature sensor 36, exhaust gas temperature signal from the combustion temperature sensor 35, flow rate signal of the emulsified fuel from the supply flow rate sensor 20, flow rate signal of the returned fuel from the return flow rate sensor 21, residual signal and the like from each residual sensors 17, 18, 19 and 33 and starts to generate and supply the emulsified fuel having an optimum water ratio.

Figure 2:
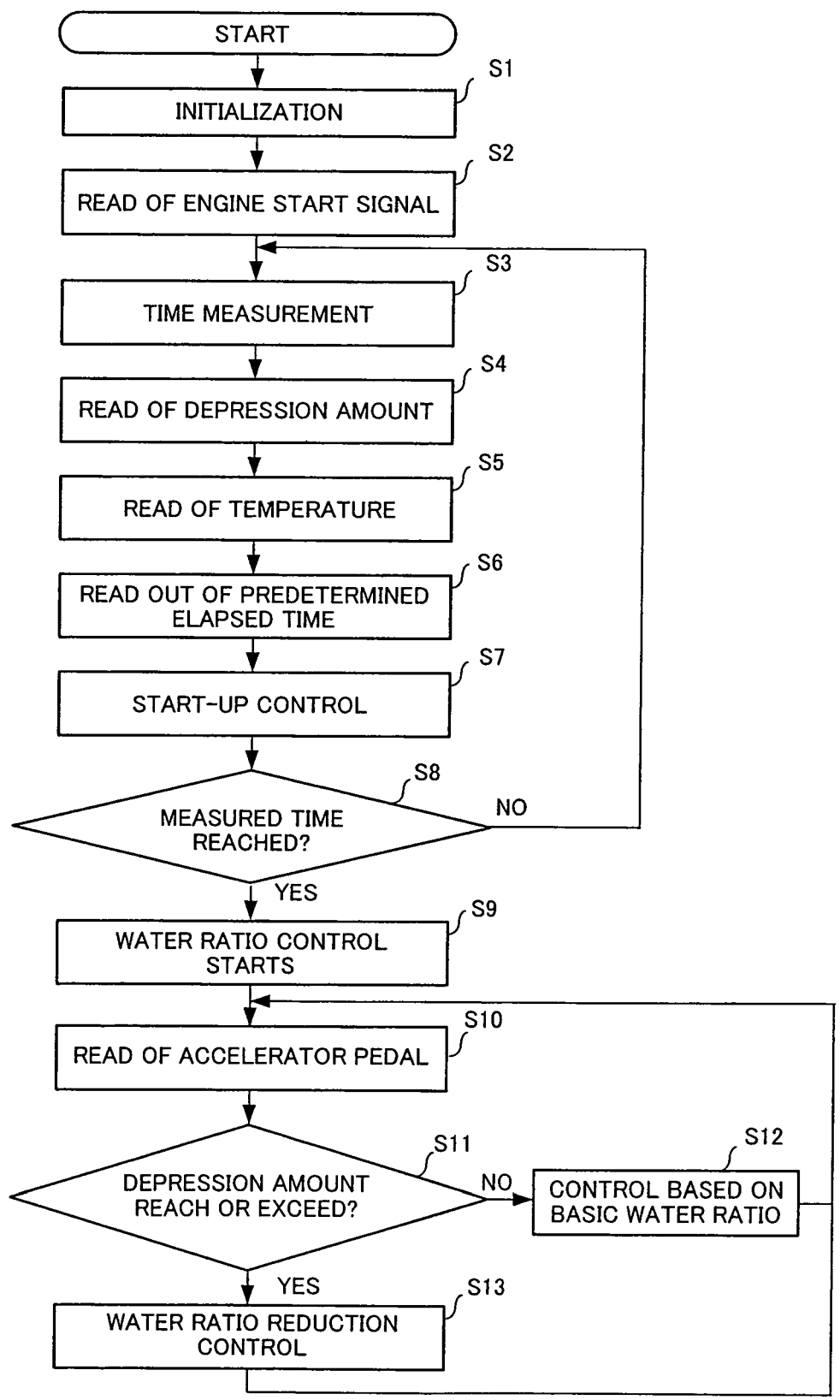
FIG. 2 is a control flow chart for controlling water ratio adjustment in the exhaust purifier of the diesel engine shown in FIG. 1.

As shown in a control flow chart in FIG. 2, when the power supply to the emulsion controller 16 is turned on accompanying the ON-actuation of the starter switch, at Step S1, the emulsion controller 16 initializes the internal memory; at Step S2, reads the engine start signal. When the engine has started, the emulsion controller 16 proceeds to Step S3 and begins to measure the time from the point of the engine start with a timer.

Then, at Step S4, the emulsion controller 16 reads pedal depression amount of the accelerator pedal from the accelerator opening sensor 39, and at Step S5, reads the coolant temperature from the cooling water temperature sensor 26. Then, at Step S6, the emulsion controller 16 reads a predetermined elapsed time corresponding to the read cooling water temperature from a map of cooling water temperature-predetermined elapsed time, which has been previously organized based on experiments and the like.

At Step S7, starting control of the water ratio is started.

That is, at the starting up, the emulsion controller 16 closes the flow variable control valves 12, 13 and 14 respectively for the water tank 5, the emulsifier cartridge 6, and the return reservoir 31, and opens only the flow variable control valve 11 for the light oil tank 4 up to the flow path dimensions corresponding to the accelerator pedal depression amount (ordinarily, initially, idling operation amount). The emulsion controller 16 drives only the fuel pump 7 and leaves the other pumps 8-10 stopped. Accordingly, only the fuel of 100% light oil (therefore, fuel of water ratio 0%), which is supplied from the flow variable control valve 11 to the static mixer 15, is sent to the fuel injection pump 23. Being controlled by the engine control unit 38, the fuel injection pump 23 injects the above-described light oil of optimum injection amount from the fuel injection valve 22 into the combustion chamber 41, in which the air is previously inhaled from the intake port 27, at optimum injection timing for optimum period of injection. The piston 24 rises in the situation that the intake valve 29 and the exhaust valve 30 close the intake port 27 and the exhaust port 28 to ignite the light oil by the heat of compression, then the piston 24 is lowered by the gas expansion due to the combustion so as to drive the engine to turn.

As a result, in the above starting up, since the fuel is the 100% light oil including no water, the engine can be started easily same as the case of an ordinary diesel engine. As for the nitrogen oxides (NOx) generated at the starting up, although it is impossible to take positive measures, the amount of the NOx generated in the exhaust gas discharged from the engine is small since the engine is still cool and is in an idling operation state. Although Particulate Matter (PM) increases, a large amount of the generated PM such as soot can be captured and burnt in the exhaust purifier.

That is to say, since the temperature of the DPF 34 detected by the reaction chamber temperature sensor 36 is lower than the oxidation catalyst activation temperature, the pre-heater controller 37 swiftly heats up the electric heater 43. In addition to that, since the combustion of the light oil 100% increases the temperature of the exhaust gas, the DPF 34 is heated as soon as possible to oxidize the PM discharged from the engine in the oxidation catalyst reaction chamber 34a of the DPF 34 to clean the exhaust gas.

Also, accompanying the engine start, since the agitator 44 provided in the return reservoir 31 is agitated. The emulsification of the fuel is further advanced by being agitated again even when the emulsified fuel in the return reservoir 31 has separated into fuel and water due to the stoppage of the engine for a certain period of time.

At Step S8, it is determined whether the measured time has reached the above-described predetermined elapsed time. When the predetermined elapsed time is not reached yet, the control returns to Step S3. When it has reached the predetermined elapsed time, the control proceeds to Step S9.

At Step S9, no-water control is stopped and ordinary water ratio control is started. At Step S10, accelerator pedal depression amount signal is read out.

At Step S11, it is determined whether the accelerator pedal depression amount is equal to or exceeds the predetermined pedal depression amount (here, set to the kick down equivalent opening). When it is smaller than the predetermined pedal depression amount, it is judged that it is not the torque deficiency, and the control proceeds to Step S12. Here, while referring to the map of accelerator pedal depression amount-water ratio, it is controlled corresponding to the accelerator pedal depression amount, in accordance with the basic water ratio such that the water ratio increases as the accelerator pedal depression amount becomes higher.

Accordingly, the emulsion controller 16 drives each of the pumps 7, 8, 9 and 10 for the light oil tank 4, the water tank 5, the emulsifier cartridge 6, and the return reservoir 31, and opens the flow path dimensions of the flow variable control valves 11, 12, 13 and 14 to the ratio respectively so that the optimum water ratio is obtained corresponding to the accelerator pedal depression amount to supply them to the static mixer 15. As a result, the emulsified fuel of an optimum water ratio corresponding to the accelerator pedal depression amount is supplied to the fuel injection valve 22, and power performance and exhaust emission purification efficiency can be optimally reconciled.

As for the map of the above accelerator pedal depression amount-water ratio, for example, in a range that the accelerator pedal depression amount is low, the light oil:water is set to 95:5; in a range that accelerator pedal depression amount is medium level, the same is set to 85:15; and in the range that the accelerator pedal depression amount is high, the same is set to 80:20. These serve as the basic water ratio.

When Step S12 has completed, the control returns to Step S10.

On the other hand, when the predetermined pedal depression amount is reached or exceeded, it is determined as torque deficiency, then the control proceeds to Step S13, and a control is made in which the water ratio is set to a ratio (here, water ratio is set to, for example, 0%) lower than the basic water ratio during the above-described normal driving. As a result, power performance (in this case, the magnitude of the torque is important) is increased, even when hill climbing on a steep slope or passing with a large load, hill climbing or sudden acceleration can be achieved without getting into the torque deficiency.

During the water ratio reduction control, since the load is large, the engine speed is also prevented from rising. Thus, compared to the normal driving, the NOx reduces although the PM increases. The increased PM is captured by the DPF 34 and combusted therein to remove it. Also, since the period of the torque deficiency is short in almost all cases, from this viewpoint also, the decrease of the exhaust emission control performance is small as a whole.

After performing the control at the torque deficiency, the control returns to Step S10.

Although not described in the above control flow chart, it is arranged such that the emulsion controller 16, when receiving engine stop signal, switches to the fuel of no-water, i.e., light oil 100% and operates the engine for a predetermined period of time from that point to prevent water from remaining in the engine and the parts in the exhaust system to avoid corrosion.

On the other hand, the PM in the exhaust gas enters the DPF 34 and is oxidized into $CO_2$ by the oxidation catalyst in the oxidation catalyst reaction chamber 34a. Likewise, the carbohydrate (HC) in the exhaust gas is also changed into $CO_2$ and $H_2O$ in the oxidation catalyst reaction chamber 34a of the DPF 34. The incombustible ash is captured in the ash accumulation chamber at the downstream of the oxidation catalyst reaction chamber 34a to prevent it from being discharged into the external. However, the amount of the ash is small.

When information signal about the oxidation reaction chamber temperature detected by the reaction chamber temperature sensor 36 is input to the emulsion controller 16, and in the case where the oxidation reaction chamber temperature has extraordinary risen and the filter, catalyst or the like therein may be destroyed, the emulsion controller 16 increases the water ratio exceeding the basic water ratio to lower the exhaust gas temperature. To the contrary, to sharply increase the temperature in the DPF 34 to accelerate the oxidization, it is adapted so as to reduce the water ratio to be smaller than the basic water ratio.

As described above, in the exhaust purifier for diesel engines according to the first embodiment, the water ratio is controlled in accordance with the magnitude of the accelerator pedal depression amount; thereby it is always possible to ensure required power performance in a broad engine operational range, while enhancing the exhaust emission control performance and reducing the generation of the NOx. When hill climbing on a steep slope or a sudden acceleration with a heavy load is required, it is arranged so that the water ratio is reduced smaller than the basic water ratio at the normal driving when it is detected that the pedal is depressed up to an accelerator pedal depression amount equal to or over a predetermined value such as a kick down point, therefore it is possible to obtain a large torque allowing the hill climbing on a steep slope and the sudden acceleration. In this case, the NOx increases slightly, however since the engine revolution is reduced, the NOx decreases to a lower level than that during normal driving and the period thereof is short, the NOx does not reach a level that causes a problem. Further, the PC such as soot or the like that is generated a lot at that time can be removed by the DPF 34.

Furthermore, since it is arranged so that no-water control is made at the engine start and that this period of the control is set based on the cooling water temperature, it becomes possible to reliably start up the engine and to operate it stably until it is warmed up. And when the engine is stopped, likewise no-water control is made so as not to allow any water to remain in the engine or parts of the exhaust system. Accordingly, it is possible to prevent any rust from gathering.

Then, an exhaust purifier for diesel engines according to a second embodiment of the invention will be described below.

Figure 3:
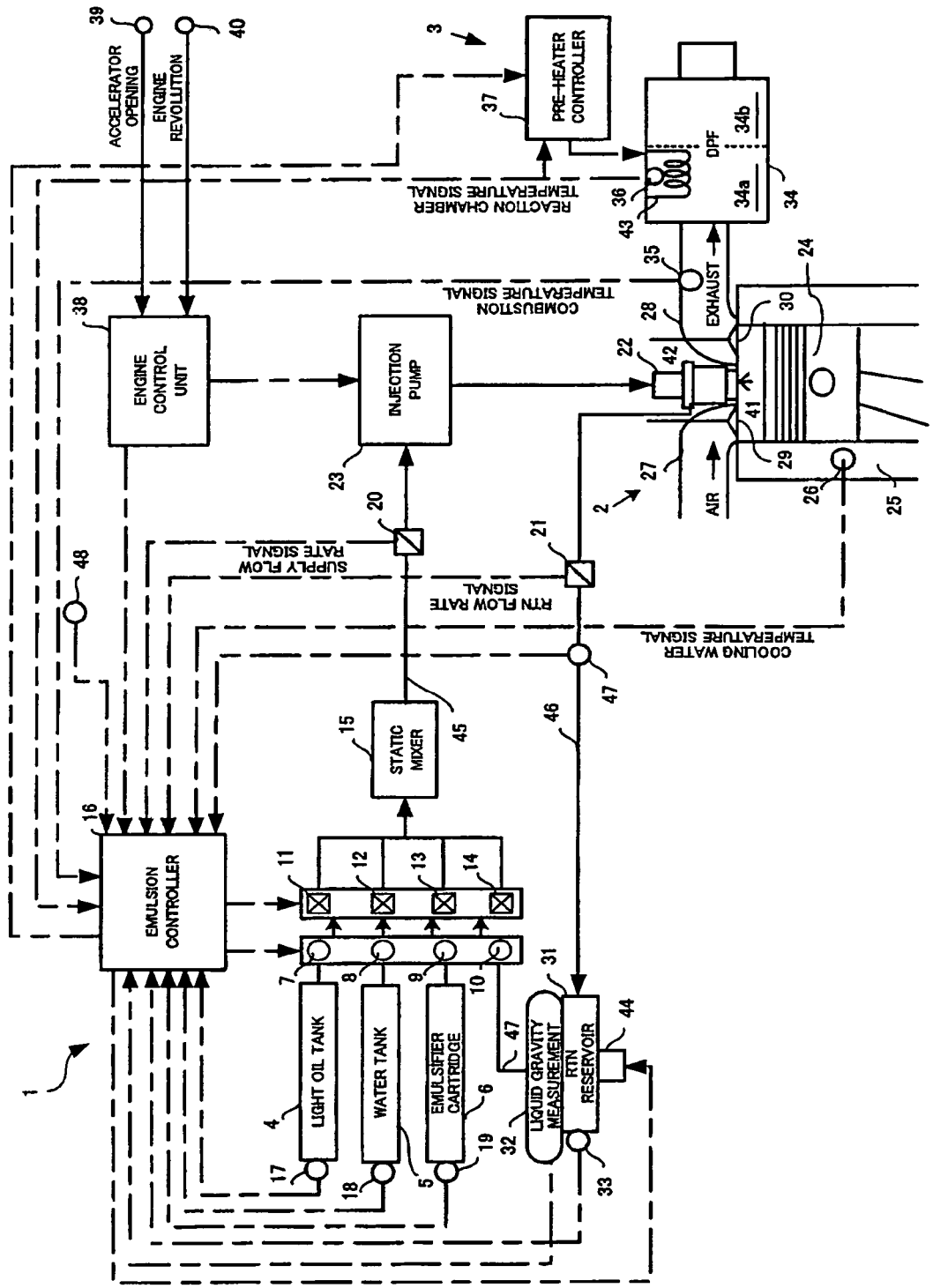
FIG. 3 is a diagram showing the entire power train containing the exhaust purifier for diesel engines according to the second embodiment of this invention.

FIG. 3 shows a constitution of a power train in the second embodiment. In FIG. 3, the substantially same items as those in FIG. 1 will be given with the same reference symbols as those in FIG. 1; and the descriptions thereof will be omitted.

A non-driving wheel (not shown) is provided with a wheel speed sensor 48 for detecting wheel speed to send a signal about the wheel speed to the emulsion controller 16. And in the return path 46 connecting between the fuel injection valve 22 and the return reservoir 31, a return temperature sensor 47 is provided to send a signal about the temperature of the returned fuel to the emulsion controller 16. The other constitution is substantially the same as that in FIG. 1.

The exhaust purifier for diesel engines having the above constitution is controlled in accordance with a control flow chart as described below.

Figure 4:
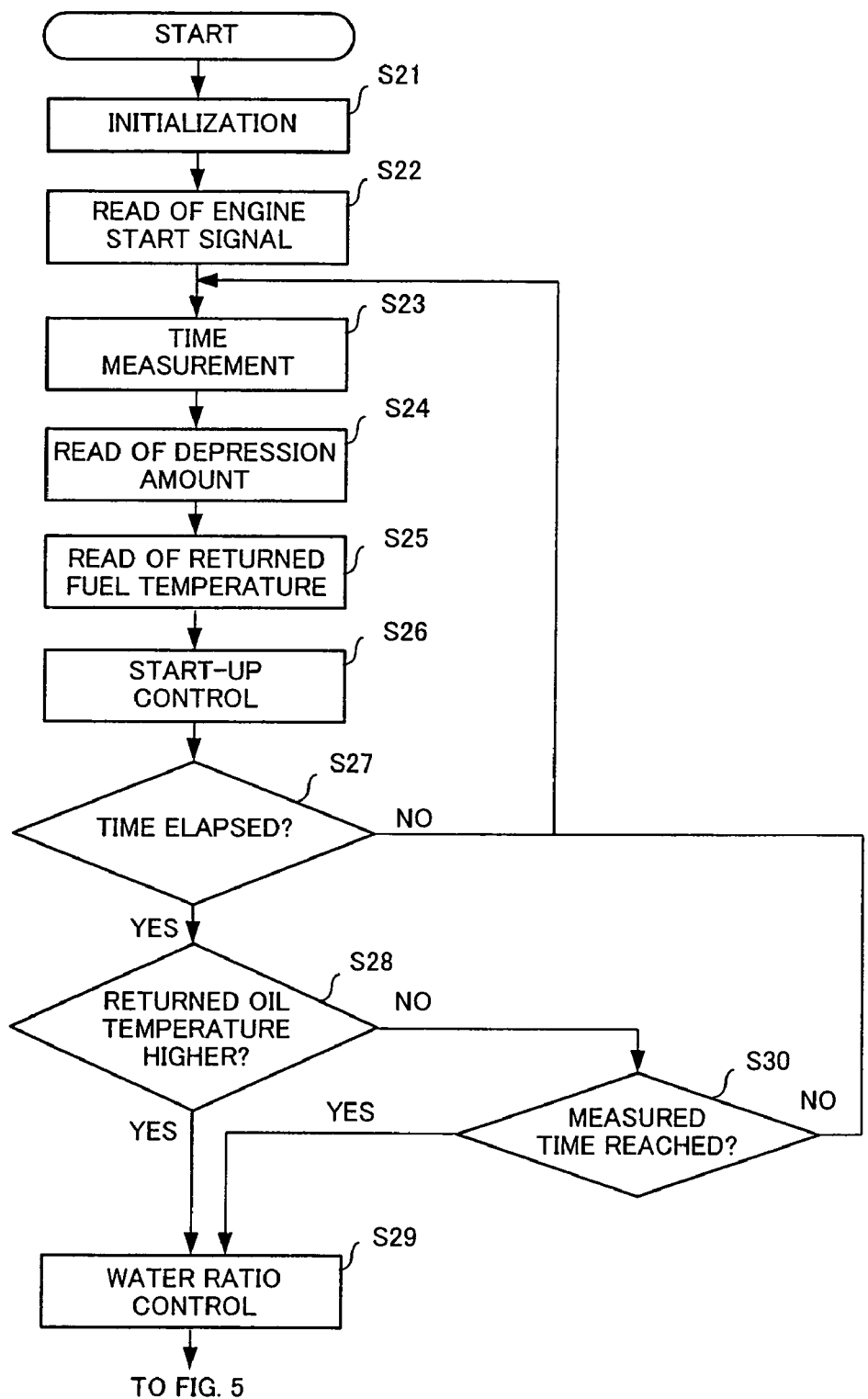
Figure 5:
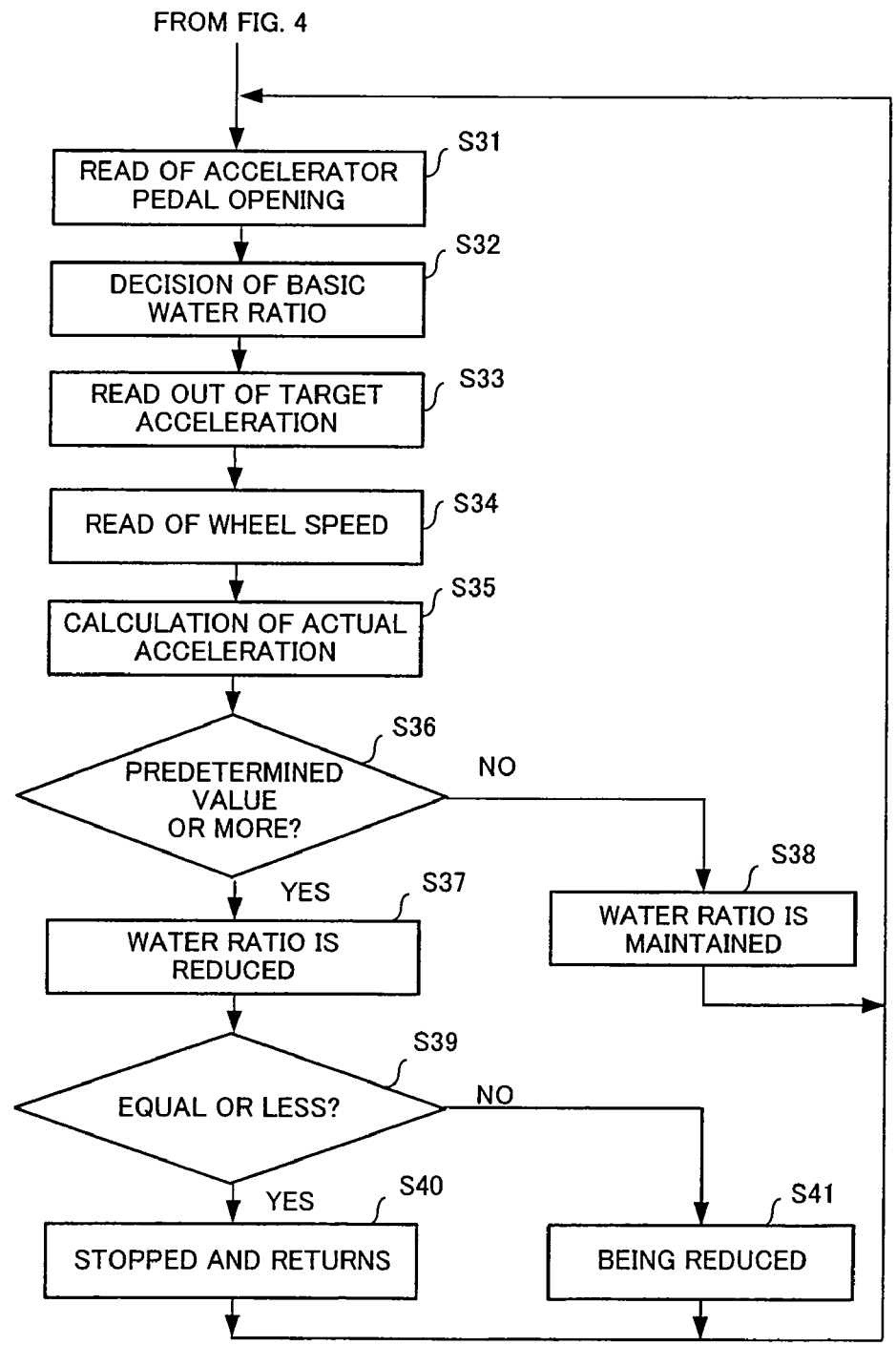

That is, in FIGS. 4 and 5 showing the control flow chart, when the power supply to the emulsion controller 16 is turned on, control operation starts in accordance with the control flow chart. At Step S21, the memory in the emulsion controller 16 is initialized. At Step S22, engine start signal is read. When the engine has started, the control proceeds to Step S23, and time measurement is started from the point of engine start with the timer.

Then, at Step S24, pedal depression amount of the accelerator pedal is read from the accelerator opening sensor 39; at Step S25, the returned fuel temperature is read from the return temperature sensor 47.

At Step S26, starting control, in which only the light oil of water ratio 0%, i.e., 100% light oil is supplied, is made. Then, at Step S27, it is determined whether a predetermined period of time (for example, 2 minutes) has elapsed from the engine start. When the predetermined period of time has not reached yet, the control returns to Step S23. When it is determined that the predetermined period of time has elapsed, the control proceeds to Step S28, and determines whether the temperature of the returned fuel detected by the return temperature sensor 47 is higher than a predetermined temperature (for example, approximately 5° C.-15° C., more particularly, approximately 10° C. or so, i.e., approximately 8° C.-12° C. is the best). When it is not higher than the predetermined temperature, it is determined whether the measured time has reached a set period of time (it is preferably set to be a period of time longer than the above predetermined period of time, which is estimated the engine would be reliably warmed up).

When it is shorter than the set period of time, the control returns to Step S23.

On the other hand, when the set period of time has elapsed, or when the returned fuel temperature is higher than the predetermined temperature at Step S28, the control proceeds to Step S29 to stop the starting control and start the water ratio control.

At Step S31, pedal depression amount of the accelerator pedal is read from the accelerator opening sensor 39. At Step S32, a water ratio corresponding to the pedal depression amount of the accelerator pedal is decided. The water ratio is set as the basic water ratio based on the same map as that of the first embodiment.

Further, at Step S33, a target acceleration corresponding to the pedal depression amount of the accelerator pedal at the point of time is read out based on a map of accelerator pedal depression amount-target acceleration (acceleration equivalent to vehicle speed obtained during flat road driving with a light load), which has been previously set based on research and experiments. In the second embodiment, the acceleration equivalent to the vehicle speed is defined as the acceleration of the non-driving wheel. Step S33 constitutes a target acceleration setting means.

Then, at Step S34, the wheel speed is read out from the wheel speed sensor 48 and the actual acceleration is calculated based on the above wheel speed at Step S35. These Steps S34 and S35 constitute actual acceleration detection means.

At the next Step S36, it is determined whether the difference between the target acceleration and the actual acceleration is equal to a predetermined value or more. When the difference is smaller than the predetermined value, it is determined as state of non torque deficiency, and the control proceeds to Step S38. When the difference is equal to the predetermined value or more, it is determined as torque deficiency, and the control proceeds to Step S37. The above-predetermined value is decided based on data collected from experiments about the acceleration difference in the case where an ordinary driver feels as torque deficiency. Further, it is set so that, for example, when the accelerator opening is large, the predetermined value is larger than that when the accelerator opening is small. The Step S36 constitutes torque deficiency judgment means.

That is to say, when the acceleration difference is equal to the predetermined value or more, the control proceeds to Step S37 to correct so as to reduce the basic water ratio decided at Step S32. In this case, it is adapted so that the correction amount of water reduction is changed corresponding to the magnitude of the above acceleration difference (reduction value). In this case, it is preferred to set so that the larger water reduction amount (or water reduction ratio) is set for the larger acceleration difference.

After correcting the water ratio, a new acceleration difference is detected again at Step S39, and it is determined whether the acceleration difference (reduction value) is the set value or less. When the difference is the set value or less, the control proceeds to Step S40, and when the difference exceeds the set value, the control proceeds to Step S41. Here, the set value is set to a value smaller than the predetermined value at above Step S36 (minus value is also possible), which is a value that it is not felt as torque deficiency even when the water ratio is increased. As described above, by giving hysteresis between the predetermined value and the set value, the control of the water ratio is prevented from hunting while ensuring an optimum water ratio.

When it is determined at Step S39 that the acceleration difference is the set value or less due to moderate slope inclination or the like, it is determined that the torque deficiency has been cleared. Then the water ratio reduction control is stopped at Step S40, the water is increased up to the basic water ratio, and the control returns to Step S31.

On the other hand, when the acceleration difference exceeds the set value, it is decided at Step S41 that the water ratio is left being reduced because the torque deficiency is still continuing; and the process returns to Step S31.

The above-described Step S32 and Steps S36-S41 constitute water ratio determination means.

As describe above, in the exhaust purifier for diesel engines according to the second embodiment, the exhaust emission control performance and the power performance are allowed to be consistent with each other in a broad engine operational range during the normal driving, same as the first embodiment. In addition, the torque deficiency is determined in accordance with the acceleration difference between the target acceleration and the actual acceleration corresponding to the accelerator pedal depression amount to control the water ratio. Also, in this case the torque deficiency is easily detected and determined to allow the torque to be increased at a hill climbing or sudden acceleration with a heavy load resulting in ensuring the power performance. In this case, although the exhaust emission control performance decreases, the influence thereof is small.

Further, since the torque deficiency is determined using the acceleration difference, it is possible to produce various modifications and corrections to obtain a control with higher preciseness as described later. Here, the invention is not limited to the above-described embodiments, but the following modification or correction may be used.

In the above-described embodiments, the accelerator pedal depression amount is detected based on the pedal depression amount of the accelerator pedal. However, in place of this, supply flow rate of the emulsified fuel detected by the supply flow rate sensor 20, or the flow rate difference in which the flow rate of the returned fuel detected by the return flow rate sensor 21 is subtracted from the supply flow rate may be used to determine the torque deficiency or to decide the water ratio. In this case, since it is not necessary to receive any information signal from the engine control unit 38 side, there is a merit such that, even when the engine control unit or communication system of the information signal may differ depending on the maker or vehicle, they can be applied without knowing them.

Further, in the above-described embodiment, the actual acceleration of the vehicle is calculated from the wheel speed. However, a speed change per time may be detected from a speed meter, or an acceleration meter, which detects positional change of mass corresponding to the acceleration, may be used.

Furthermore, as for the judgment of the torque deficiency, it may be determined as the torque deficiency when the acceleration difference is equal to a predetermined value or more although the accelerator pedal depression amount has increased by a predetermined amount or more within a predetermined period of time; or when a vehicle speed decelerates at or exceeding a predetermined value within a predetermined period of time although depression amount of the accelerator pedal is equal to a predetermined amount or more, and accelerator pedal depression amount does not substantially change within a predetermined period of time.

By adapting as described above, it is possible to reliably detect the driver's will to increase the speed based on the sharp depression of the accelerator pedal.

In the second embodiment, the torque deficiency is determined based on whether the magnitude of the acceleration difference is equal to a predetermined value or more. In this case, it may be adapted so that the larger acceleration difference results in the smaller water ratio; two or more predetermined values are set corresponding to the magnitude of the accelerator pedal depression amount; or the value increases as the depression amount of the accelerator pedal increases, or the like. By adapting as described above, it is possible to obtain a fine control corresponding to the actual driving conditions.

Likewise, by setting so that the set value becomes smaller as the accelerator pedal depression amount becomes higher, it is possible to obtain a fine control corresponding to the actual driving conditions.

When the accelerator pedal depression amount becomes substantially zero and acceleration of a vehicle detected based on the wheel speed or the like exceeds a permissible value, in such a case as descending on a steep slope, it is the state that the engine is driven by the driving wheel-side, therefore the basic water ratio may be corrected so that the water ratio is increased. Owing to this arrangement, water can be increased without problem of engine stop resulting in an enhanced purification of the exhaust gas. When the above acceleration decreases to a value equal to the above permissible value or less, the control to correct to increase the water ratio is stopped and returns to the basic water ratio.

Furthermore, unlike the above-described embodiments in which the emulsifier is stored in an emulsifier cartridge separated from the fuel tank, the emulsifier may be previously mixed with the fuel in the fuel tank. In this case, the fuel supply system substantially substitutes for the emulsifier supply equipment.

INDUSTRIAL APPLICABILITY

As described above, the exhaust purifier for diesel engines of the invention is constituted so that the water ratio is controlled to a basic water ratio corresponding to the accelerator pedal depression amount so that, during normal driving, in an engine operational range in which the accelerator pedal depression amount is larger, the water ratio increases from that in the engine operational range in which the accelerator pedal depression amount is smaller; and that the torque deficiency is determined based on the accelerator pedal depression amount and the water ratio decreases to a value lower than the basic water ratio in the case of torque deficiency. Therefore, it is possible to ensure the power performance while increasing the cleaning performance by suppressing, particularly, generation of the nitrogen oxides in the exhaust gas in a broad engine operational range. Accordingly, the invention is the most suitable to be applied to vehicles mounted with a diesel engine.

While the present invention has been described with reference to the preferred embodiments, it is our intention that the invention be not limited by any of the details of the description thereof.

As this invention may be embodied in several forms without departing from the spirit of the essential characteristics thereof, the present embodiments are therefore illustrative and not restrictive, since the scope of the invention is defined by the appended claims rather than by the description preceding them, and all changes that fall within meets and bounds of the claims, or equivalence of such meets and bounds thereof are intended to be embraced by the claims.

What is claimed is:

1. A diesel engine exhaust purifier comprising:
a fuel injection valve for injecting fuel into a combustion chamber of a diesel engine;
a fuel supply system for supplying fuel;
a water supply feed unit for supplying water;
an emulsifier feed unit for supplying emulsifier;
a load detection means for detecting an accelerator pedal depression amount;
a water ratio adjusting device for adjusting a water ratio from said water supply feed unit in relation to fuel from said fuel supply system;
a static mixer for blending emulsified fuel from said emulsifier, said adjusted fuel and water and for supplying this emulsified fuel to said fuel injection valve;
a torque deficiency judgment means for judging whether or not a torque deficiency exists relative to said accelerator pedal depression amount; and
a water ratio determination means for setting a basic water ratio in which the water ratio of a larger accelerator depression amount in an engine operating range increases more than a smaller accelerator pedal depression amount in an engine operating range corresponding to accelerator pedal depression amount detected by said load detection means and for controlling said water ratio adjusting device to regulate a basic ratio when said torque deficiency judgment means judges a torque deficiency does not exist and a lower water ratio when said torque deficiency judgment means judges a torque deficiency does exist.

2. The diesel engine exhaust purifier according to claim 1, wherein said torque deficiency judgment means judges a torque deficiency exists when said accelerator pedal depression amount is an amount of the actual maximum depression of an accelerator pedal.

3. The diesel engine exhaust purifier according to claim 1, wherein said torque deficiency judgment means judges a torque deficiency exists when an acceleration difference is acquired and this acceleration difference becomes higher than a predetermined value by subtracting the target acceleration of a vehicle or a wheel made to respond to said accelerator pedal depression amount from the actual acceleration of said vehicle or wheel.

4. The diesel engine exhaust purifier according to claim 3, wherein a reduction of said water ratio while judging said torque deficiency is set so that as said acceleration difference becomes higher said water ratio becomes lower.

5. The diesel engine exhaust purifier according to claim 3 or 4, wherein said water ratio determination means cancels reduction of said water ratio when said acceleration difference becomes lower than a preset value less than said predetermined value.

6. The diesel engine exhaust purifier according to claims 3 or 4, wherein said predetermined value has a plurality of different values corresponding to the magnitude of said accelerator pedal depression amount.

7. The diesel engine exhaust purifier according to of claims 3 or 4, wherein said predetermined value increases as said accelerator pedal depression amount becomes higher.

8. The diesel engine exhaust purifier according to claim 5, wherein said preset value is set to become lower as said accelerator pedal depression amount becomes higher.

9. The diesel engine exhaust according to claims 3 or 4, wherein said torque deficiency judgment means judges torque deficiency when said acceleration difference becomes higher than a predetermined value even though said accelerator pedal depression amount increases more than a predetermined amount within a predetermined time.

10. The diesel engine exhaust purifier according to claims 3 or 4, wherein said torque deficiency judgment means judges torque deficiency when vehicle speed decelerates more than predetermined within a predetermined time even though said accelerator pedal depression amount is more than a predetermined amount and said accelerator pedal depression amount does not change substantially within a predetermined time.

11. The diesel engine exhaust purifier according to claim 1, wherein said accelerator pedal depression amount is a value corresponding to the fuel flow rate supplied to said fuel injection valve or a value corresponding to the flow rate difference of this flow rate and the return fuel flow rate discharged from said fuel injection valve.

12. The diesel engine exhaust purifier according to claim 1, wherein said water ratio determination means sets the water ratio to substantially zero for a period of a predetermined time from diesel engine start-up time until any one of the engine coolant temperature, the temperature of said return fuel in the return passage or the transmission temperature reaches a predetermined temperature.

13. The diesel engine exhaust purifier according to claim 1, wherein said water ratio determination means sets the water ratio to substantially zero until a predetermined time elapses after detecting a diesel engine stop signal.

14. The diesel engine exhaust purifier according to claim 1, wherein said water ratio is controlled corresponding to the exhaust gas temperature within a diesel particulate filter.

\* \* \* \* \*